(12) United States Patent
Watanabe

(10) Patent No.: US 7,142,117 B2
(45) Date of Patent: Nov. 28, 2006

(54) ELECTRONIC CIRCUIT FOR CONTACTLESS TAG, AND CONTACTLESS TAG

(75) Inventor: Shinichiro Watanabe, Tokyo-to (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 10/811,790

(22) Filed: Mar. 29, 2004

(65) Prior Publication Data

US 2004/0227002 A1 Nov. 18, 2004

(30) Foreign Application Priority Data

Apr. 1, 2003 (JP) ............................. 2003-098276

(51) Int. Cl.
*G08B 13/14* (2006.01)

(52) U.S. Cl. ................ 340/572.1; 235/491; 340/572.8; 320/128

(58) Field of Classification Search ............. 340/636.1, 340/636.2, 572.5, 572.1, 572.8, 10.34; 320/166, 320/167, 128
See application file for complete search history.

(56) References Cited

U.S. PATENT DOCUMENTS

| | | | | |
|---|---|---|---|---|
| 4,384,288 A | * | 5/1983 | Walton | ........................ 340/5.8 |
| 5,929,778 A | * | 7/1999 | Asama et al. | ............ 340/10.51 |
| 5,977,748 A | * | 11/1999 | Okamura | ...................... 320/118 |
| 6,011,488 A | * | 1/2000 | Busser | ...................... 340/10.34 |
| 6,011,958 A | * | 1/2000 | Yokota et al. | ................. 455/73 |
| 6,079,622 A | * | 6/2000 | Goto | ........................... 235/492 |
| 6,404,339 B1 | * | 6/2002 | Eberhardt | ................. 340/572.1 |
| 6,424,125 B1 | * | 7/2002 | Graham | ....................... 320/166 |
| 6,489,883 B1 | * | 12/2002 | Iiyama et al. | ................. 340/5.1 |
| 6,747,548 B1 | * | 6/2004 | Yamaguchi | ............... 340/10.51 |
| 2001/0000659 A1 | * | 5/2001 | Hayashi et al. | ........... 340/10.34 |
| 2002/0153997 A1 | * | 10/2002 | Nakane et al. | ............ 340/10.34 |

FOREIGN PATENT DOCUMENTS

| | | | |
|---|---|---|---|
| GB | 2292866 A | * | 3/1996 |
| JP | 05-292683 | | 11/1993 |
| JP | 2000-242756 | | 9/2000 |
| JP | 2001-250097 | | 9/2001 |
| JP | 2002-209343 | | 7/2002 |
| WO | 02/086811 | | 10/2002 |

* cited by examiner

*Primary Examiner*—Jeffrey Hofsass
*Assistant Examiner*—Hoi C. Lau
(74) *Attorney, Agent, or Firm*—Hogan & Hartson LLP

(57) ABSTRACT

An electronic circuit for a contactless tag includes a rectification circuit that rectifies an induced electromotive force caused by bringing an antenna coil into close proximity to a reader/writer to generate a rectified voltage and a secondary battery. A charging/discharging circuit is provided that charges according to the rectified voltage and discharges the secondary battery.

20 Claims, 2 Drawing Sheets

ELECTRONIC CIRCUIT FOR CONTACTLESS TAG, AND CONTACTLESS TAG

BACKGROUND OF THE INVENTION

1. Technical Field of the Invention

The present invention relates to a contactless tag and also relates to an electronic circuit for the contactless tag used in a Radio Frequency IDentification (RFID) tag or a RFID card.

2. Description of the Related Art

An electronic circuit for a contactless tag includes an antenna that receives data for communication with a reader/writer. In a conventional electronic circuit, a signal received by an antenna is rectified, thereby forming a power supply.

For installation of a memory or a display unit, it is conceivable to use a secondary battery that can be charged within seconds. The charging time of the secondary battery has a high charging rate of 1:1. The current of the battery capacity is given by the following equation:

Charging Time≈1 mA/h÷1 mA=1 hour where the secondary battery capacity=3 V, 1 mA/h, and the charging current=1 mA. A problem occurs in that it takes a long time to fully charge the battery.

The present invention has been made in view of this problem with conventional electronic circuit, and it is an advantage of the present invention to provide an electronic circuit for a contactless tag that can be fully charged in a short period of time, and to provide a contactless tag.

SUMMARY OF THE INVENTION

In order to overcome this problem, the present invention employs the following. According to an embodiment of the present invention, an electronic circuit for a contactless tag includes a transceiving device for data communication with a reader/writer. The transceiving device includes an antenna coil. The electronic circuit includes a rectifying device that rectifies an induced electromotive force caused by bringing the antenna coil into close proximity to the reader/writer to generate a rectified voltage. A secondary battery is also provided. A charging/discharging circuit is charged according to the rectified voltage and discharges the secondary battery.

According to an embodiment of the present invention, the charging/discharging circuit includes a capacitor that stores a charge according to the rectified voltage. A resistor acts as a time-constant resistor, through which the capacitor supplies a discharge voltage to the secondary battery so as to charge the secondary battery. A diode prevents the charge charged in the capacitor from flowing to a portion other than the secondary battery.

Also, according to an embodiment of the present invention, the capacitor is a device serving as an electric double-layer capacitor or a capacitor whose internal resistance is much smaller than that of the secondary battery and whose electrostatic capacitance is large. The diode is defined as a first diode and the capacitor is defined as a first capacitor. The charging/discharging circuit further includes a second diode connected in series to the first diode and a second capacitor connected in parallel to the first capacitor between the first diode and the second diode. The second capacitor has a smaller capacitance than the first capacitor.

Further, according to an embodiment of the present invention, an existing antenna coil is brought into close proximity to a reader/writer to cause an induced electromotive force. The induced electromotive force is rectified to generate a rectified voltage, based on that charging/discharging circuit that is charged. Then, the charging/discharging circuit performs discharging, and the secondary battery is thus charged.

DETAILED DESCRIPTION OF THE PREFERRED EMBODIMENTS

Embodiments of the present invention will now be described with reference to the drawings.

First Embodiment: Structure

An electronic circuit for a contactless tag according to a first embodiment of the present invention will be described with reference to FIGS. 1 and 2.

Figure 1:
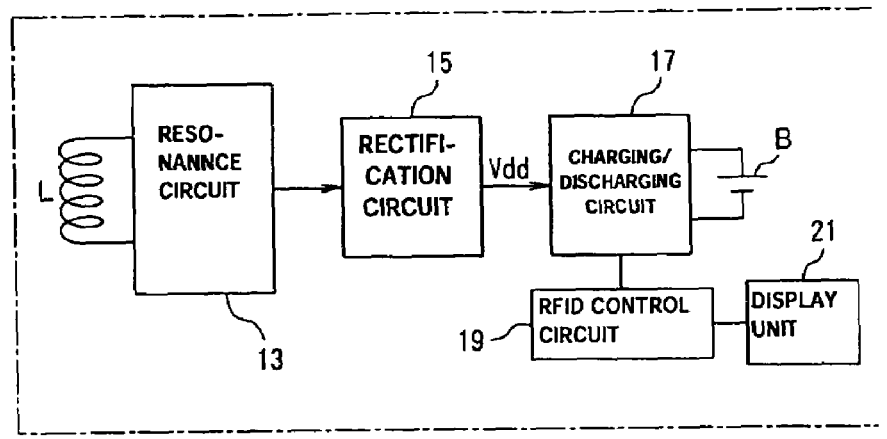
FIG. 1 is a block diagram showing the structure of an electronic circuit for a contactless tag according to a first embodiment of the present invention.

As shown in FIG. 1, the contactless-tag electronic circuit of the first embodiment includes a transceiving device for data communication with a reader/writer. The transceiving device includes a resonance circuit 13 serving as resonance device having an antenna coil L, a rectification circuit 15 serving as rectifying device for rectifying an induced electromotive force caused by bringing the antenna coil L into close proximity to the reader/writer to generate a rectified voltage Vdd. A secondary battery B is also provided. A charging/discharging circuit 17 serves as a charging/discharging means that is charged according to the rectified voltage Vdd and that discharges the secondary battery B. The secondary battery B is of the paper battery type, and has an internal resistor rb.

The contactless-tag electronic circuit of the first embodiment, which is suitable for use in a Radio Frequency IDentification (RFID) tag or a RFID card, further includes an RFID control circuit 19 having a detection circuit that detects a drop in the rectified voltage Vdd, and an electrophoretic display unit 21. The electrophoretic display unit 21 has a writing voltage of 3 V (internal boosted voltage), a current of 10 μA, and a display holding time of about several minutes.

Figure 2:
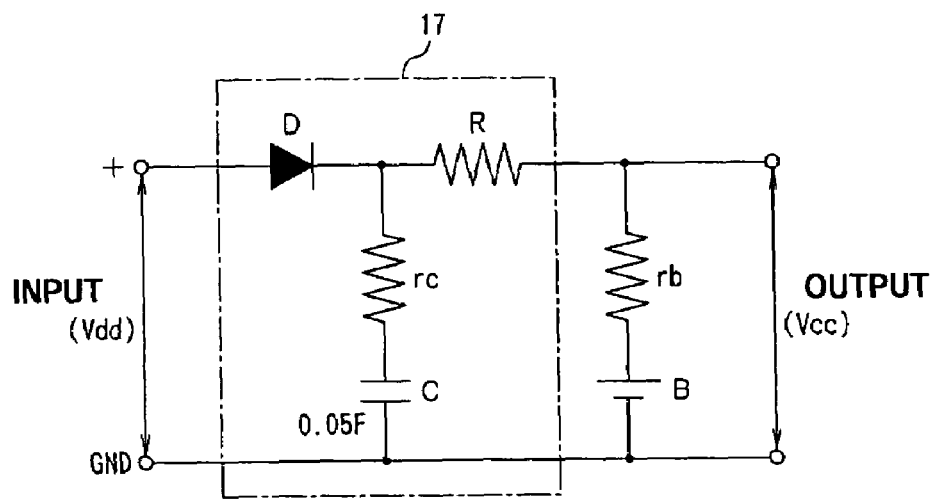
FIG. 2 is a block diagram showing the structure of a charging/discharging circuit and a secondary battery shown in FIG. 1.

Referring to FIG. 2, the charging/discharging circuit 17 includes a capacitor C, which is an electric double-layer capacitor, charged by storing a charge according to the rectified voltage Vdd supplied via a diode D of the rectification circuit 15. A resistor R acts as a time-constant resistor, through which the capacitor C supplies a discharge voltage to the secondary battery B so as to charge the secondary battery B. The capacitor C has an internal resistor rc (30 Ω).

First Embodiment: Operation

The operation of the electronic circuit of the first embodiment will now be described with reference to FIGS. 1 through 3.

The induced electromotive force of an input voltage received by the antenna coil L of the resonance circuit 13 serving as a resonance means of the contactless-tag electronic circuit of the first embodiment is rectified by the rectification circuit 15 to generate a rectified voltage Vdd.

Referring to FIGS. 2 and 3, the diode D of the charging/discharging circuit 17 applies the rectified voltage Vdd (for example, 5 V) to the capacitor C so as to prevent the current from flowing back. At this time, a current flows in the internal resistor rc (30 Ω), thus causing a charge to be stored in the capacitor C and to be charged. The capacitor C is charged until a time t1 (for about five seconds) according to the rectified voltage Vdd.

When the input voltage shown in FIG. 2, that is, the rectified voltage Vdd, fails, the charge stored in the capacitor C causes a discharge voltage to be supplied to the secondary battery B via the internal resistor rc, the resistor R, and the internal resistor rb for a period of time from t1 to t2, and the secondary battery B is therefore charged.

Referring to FIG. 2, simple charge/discharge calculation for the capacitor C is carried out, where the diode forward voltage Vf is ignored.

Charge: The charge Q charged from 0 V to 5 V is given by the following equation:

$0.05\ F \times 5\ V = 0.25\ (Q)$

Assuming that 0.25 (Q) is charged in the time t1 (five seconds), the current I is given by the following equation:

$0.25\ (Q) \div 5\ \text{sec} = 50\ \text{mA}$

Discharge: The charge Q necessary for a discharge from 5 V to 3.3 V is given by the following equation:

Charge $Q = 0.05\ F \times (5\ V \cdot 3.3\ V) = 0.085$ (coulomb)

The current I required for discharging 0.085 (coulomb) in 15 minutes is given by the following equation:

Current $I = 0.085$ (coulomb) $\div 900$ sec $= 94.4\ \mu A$

The current limiting resistance R for 94.4 μA is given by the following equation:

Current Limiting Resistance $R = (5\ V \cdot 3.3\ V) \div 94.4\ \mu A = 18\ k\Omega$ Since the current I is the mean current, the current limiting resistance R is actually half, or 9 kΩ.

Figure 3A:
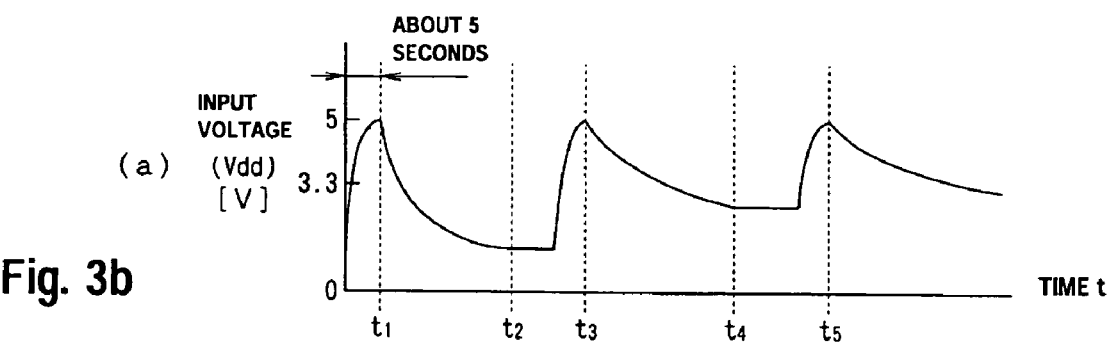
FIG. 3(a) is a charge-discharge characteristic diagram of a capacitor of the charging/discharging circuit of the contactless-tag electronic circuit shown in FIG. 1.
Figure 3B:
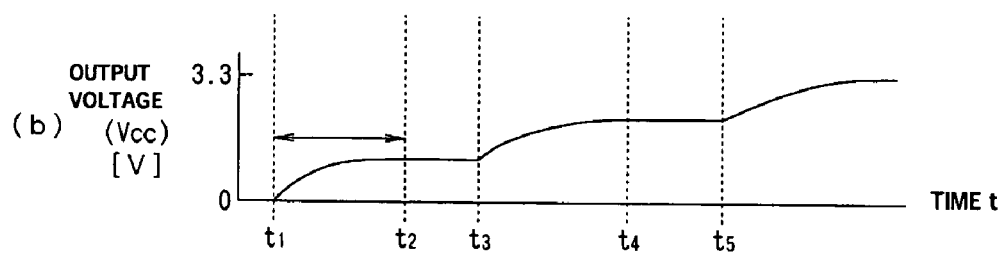
FIG. 3(b) is a charge characteristic diagram of the secondary battery of the contactless-tag electronic circuit shown in FIG. 1.

As shown in FIG. 3(a), charging/discharging from the capacitor C is repeated about four times, and the secondary battery B is charged in the manner shown in FIG. 3(b).

Second Embodiment: Structure

A charging/discharging circuit 17-1 of an electronic circuit for a contactless tag according to a second embodiment of the present invention will now be described with reference to FIG. 4.

Figure 4:
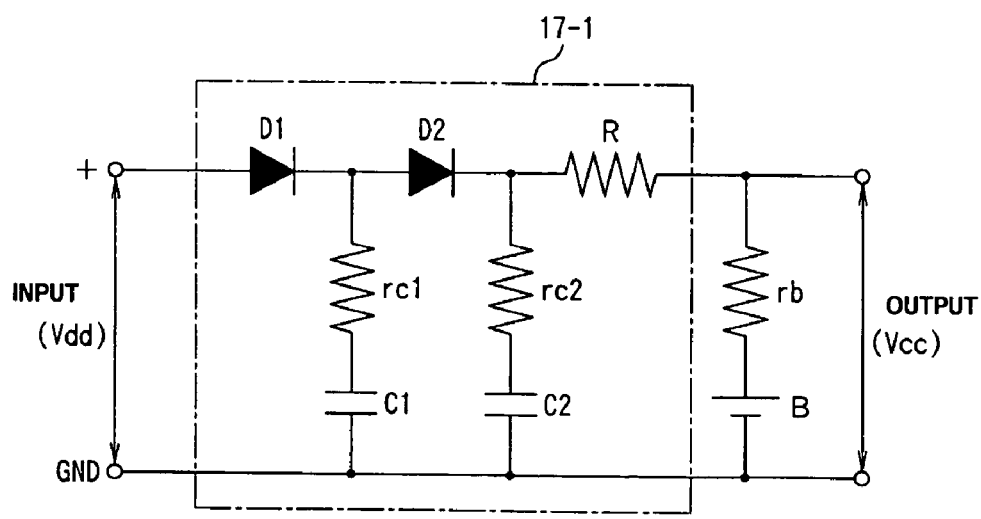
FIG. 4 is a block diagram showing the structure of a charging/discharging circuit of an electronic circuit for a contactless tag according to a second embodiment of the present invention.

The charging/discharging circuit 17-1 shown in FIG. 4 includes a first diode D1, a second diode D2 connected in series to the first diode D1, a first capacitor C1, which is an electric double-layer capacitor, having an internal resistor rc1, and a second capacitor C2 connected in parallel to the first capacitor C1, which is also an electric double-layer capacitor, having an internal resistor rc2. The second capacitor C2 has a smaller capacitance than the first capacitor C1.

The second capacitor C2 has a smaller capacitance than the capacitor C of the first embodiment.

The second capacitor C2 of a small capacitance is connected in parallel between the secondary battery B and the first capacitor C1. Thus, even when the first capacitor C1 cannot be fully charged because the supply time of the induced electromotive force caused by bringing the tag into close proximity to the reader/writer is short, a charge is stored in the second capacitor C2, and the stored charge is discharged to the secondary battery B to charge the secondary battery B.

However, in the second embodiment, the number of times of charging/discharging must be greater than that in the first embodiment. This is because the capacitance of the second capacitor C2 is small and has a small amount of charging, and therefore the amount of discharging for the secondary battery B per charge/discharge is small.

Second Embodiment: Operation

Referring to FIG. 4, when a rectified voltage Vdd is applied to the input, it is supplied via the diode D1 and the internal resistor rc1 of the first capacitor C1 so as to charge the first capacitor C1. It is also supplied via the diode D2 and the internal resistor rc2 of the second capacitor C2 so as to charge the second capacitor C2. The internal resistor rc1 is greater than the internal resistor rc2. Thus, the time required for storing a charge in the first capacitor C1 when it is charged is longer than that of the second capacitor C2.

The charge stored in the second capacitor C2 is faster discharged to the secondary battery B via the resistor R and the internal resistor rb than that in the first capacitor C1. Therefore, the secondary battery B is charged.

First and Second Embodiments: Advantages

As described above, according to the contactless-tag electronic circuit of the first and second embodiments, the charging/discharging circuit 17 or 17-1 based on the induced electromotive force caused by bringing the antenna coil L into close proximity to a reader/writer allows the secondary battery B to be fully charged in a short period of time. Particularly, according to the second embodiment, advantageously, the additional use of a second capacitor with a small capacitance supports the usage in which the supply time of the induced electromotive force is short, compared to the first embodiment.

Modifications

In the first and second embodiments, an electric double-layer capacitor is used as each of the capacitors C, C1, and C2. However, the present invention is not limited thereto. As an alternative to the electric double-layer capacitor, a device serving as a capacitor whose internal capacitance is much smaller than that of the secondary battery B and whose electrostatic resistance is large may be used.

What is claimed is:

1. An electronic circuit for a contactless tag, comprising:
    means for rectifying an induced electromotive force caused by bringing an antenna coil into close proximity to a reader/writer to generate a rectified voltage;
    a secondary battery; and
    means for being charged according to the rectified voltage and for discharging to the secondary battery,
    wherein the means for charging and discharging includes a capacitor that stores a charge according to the rectified voltage, a resistor though which the capacitor supplies a discharge voltage to the secondary battery so as to charge the secondary battery, and a diode that applies the rectified voltage to the capacitor and prevents the charge charged in the capacitor from flowing back to the means for rectifying the induced electromotive force.

2. The electronic circuit for a contactless tag according to claim 1, wherein the resistor acts as a time-constant resistor.

3. The electronic circuit for a contactless tag according to claim 2, wherein the capacitor is a device serving as an electric double-layer capacitor or a capacitor whose internal resistance is much smaller than that of the secondary battery and whose electrostatic capacitance is large.

4. The electronic circuit for a contactless tag according to claim 2, wherein the diode is defined as a first diode and the capacitor is defined as a first capacitor, and the means for charging and discharging further comprises:
a second diode connected in series to the first diode; and
a second capacitor connected in parallel to the first capacitor between the first diode and the second diode, and the second capacitor has a smaller capacitance than the first capacitor.

5. A contactless tag using the electronic circuit according to claim 1.

6. The electronic circuit for a contactless tag according to claim 1, further comprising a transceiving device for data communication with the reader/writer.

7. The electronic circuit for a contactless tag according to claim 6, wherein the transceiving device includes the antenna coil.

8. The electronic circuit for a contactless tag according to claim 6, wherein the transceiving device includes a resonance circuit.

9. The electronic circuit for a contactless tag according to claim 1, wherein the secondary battery is a paper type battery.

10. The electronic circuit for a contactless tag according to claim 1, wherein the secondary battery has an internal resistor.

11. The electronic circuit for a contactless tag according to claim 1, further comprising a detection circuit that detects a drop in the rectified voltage.

12. The electronic circuit for a contactless tag according to claim 1, further comprising an electrophoretic display.

13. The electronic circuit for a contactless tag according to claim 12, wherein the electrophoretic display includes a writing voltage, a current and a display holding time.

14. An electronic circuit for a contactless tag, comprising:
a rectification circuit that rectifies an induced electromotive force caused by bringing an antenna coil into close proximity to a reader/writer to generate a rectified voltage;
a secondary battery; and
a charging/discharging circuit that charges according to the rectified voltage and that discharges the secondary battery,
wherein the charging/discharging circuit comprises a capacitor that stores a charge according to the rectified voltage, a resistor through which the capacitor supplies a discharge voltage to the secondary battery so as to charge the secondary battery, and a diode that applies the rectified voltage to the capacitor and prevents the charge charged in the capacitor from flowing back to the rectification circuit.

15. The electronic circuit for a contactless tag according to claim 14, wherein the resistor acts as a time-constant resistor.

16. The electronic circuit for a contactless tag according to claim 15, wherein the capacitor is a device serving as an electric double-layer capacitor or a capacitor whose internal resistance is much smaller than that of the secondary battery and whose electrostatic capacitance is large.

17. The electronic circuit for a contactless tag according to claim 2, wherein the diode is defined as a first diode and the capacitor is defined as a first capacitor, and the charging/discharging circuit further comprises:
a second diode connected in series to the first diode; and
a second capacitor connected in parallel to the first capacitor between the first diode and the second diode, and the second capacitor has a smaller capacitance than the first capacitor.

18. The electronic circuit for a contactless tag according to claim 14, further comprising a transceiving device for data communication with the reader/writer.

19. The electronic circuit for a contactless tag according to claim 18, wherein the transceiving device includes the antenna coil.

20. A method for manufacturing an electronic circuit for a contactless tag comprising:
rectifying an induced electromotive force with a rectification circuit caused by bringing an antenna coil into close proximity to a reader/writer to generate a rectified voltage;
providing a secondary voltage with a secondary battery;
charging a charge/discharge circuit according to a rectified voltage and discharging the secondary battery,
storing a charge in a capacitor according to the rectified voltage;
supplying a discharge voltage via a resistor to the secondary battery so as to charge the secondary battery; and
preventing the charge charged in the capacitor from flowing back to the rectification circuit.

* * * * *